(12) United States Patent
Zhang et al.

(10) Patent No.: US 8,321,621 B2
(45) Date of Patent: Nov. 27, 2012

(54) VIDEO GRAPHICS ARRAY INTERFACE SWITCH APPARATUS

(75) Inventors: Han-Bing Zhang, Shenzhen (CN); Jian-Chun Pan, Shenzhen (CN); De-Jun Zeng, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 230 days.

(21) Appl. No.: 12/957,418

(22) Filed: Dec. 1, 2010

(65) Prior Publication Data

US 2012/0124267 A1    May 17, 2012

(30) Foreign Application Priority Data

Nov. 15, 2010  (CN) .......................... 2010 1 0544042

(51) Int. Cl.
*G06F 13/00*    (2006.01)
(52) U.S. Cl. ......... 710/316; 710/312; 345/204; 345/213

(58) Field of Classification Search ................... 710/312, 710/316; 345/204, 213
See application file for complete search history.

(56) References Cited

U.S. PATENT DOCUMENTS

| | | | |
|---|---|---|---|
| 7,607,921 B2 * | 10/2009 | Kong | 439/55 |
| 7,843,444 B2 * | 11/2010 | Huang et al. | 345/204 |
| 7,923,991 B2 * | 4/2011 | Huang | 324/750.3 |
| 8,255,609 B2 * | 8/2012 | Pan et al. | 710/316 |
| 2008/0102708 A1 * | 5/2008 | Wu | 439/652 |

OTHER PUBLICATIONS

Kramer Electronics—"User Manual for 2×1 High Resolution VGA Switcher—Model VP-201×1"; 8 pages, No Date provided.*
Texas Instruments—"Quadruple Bus Buffer Gate with 3-State Outputs—SN74LVC125A"; 20 pages, Dated Oct. 2010.*

* cited by examiner

*Primary Examiner* — Brian Misiura
(74) *Attorney, Agent, or Firm* — Altis Law Group, Inc.

(57) ABSTRACT

A video graphics array (VGA) interface switch apparatus includes first to third VGA interfaces, a single-pole double-throw (SPDT) switch, a switch control chip, and first to sixth electronic switches. The first VGA interface is connected to the second and third VGA interfaces through the switch control chip and the electronic switches. The SPDT switch is used to control the first VGA interface to be selectively connected to the second or third VGA interface.

3 Claims, 3 Drawing Sheets

US 8,321,621 B2

VIDEO GRAPHICS ARRAY INTERFACE SWITCH APPARATUS

BACKGROUND

1. Technical Field

The present disclosure relates to a video graphics array (VGA) interface switch apparatus.

2. Description of Related Art

When a motherboard is tested, a computer with a display is required to test the motherboard. Additionally, another computer with a display is also required to help operators to check circuit diagrams or other test files. Therefore, testing a motherboard needs two displays at the same time, which is costly and occupies a lot of space.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The disclosure, including the accompanying drawings, is illustrated by way of example and not by way of limitation. It should be noted that references to "an" or "one" embodiment in this disclosure are not necessarily to the same embodiment, and such references mean at least one.

Figure 1:
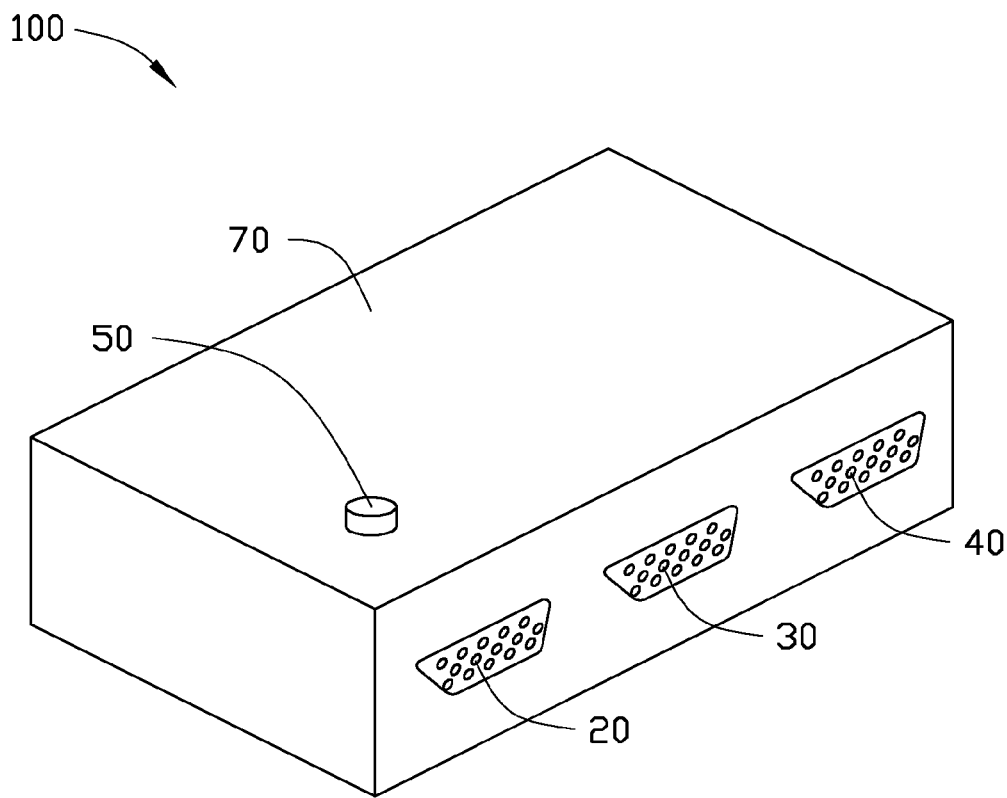
FIG. 1 is an isometric, schematic view of an embodiment of a video graphics array (VGA) interface switch apparatus.
Figure 2:
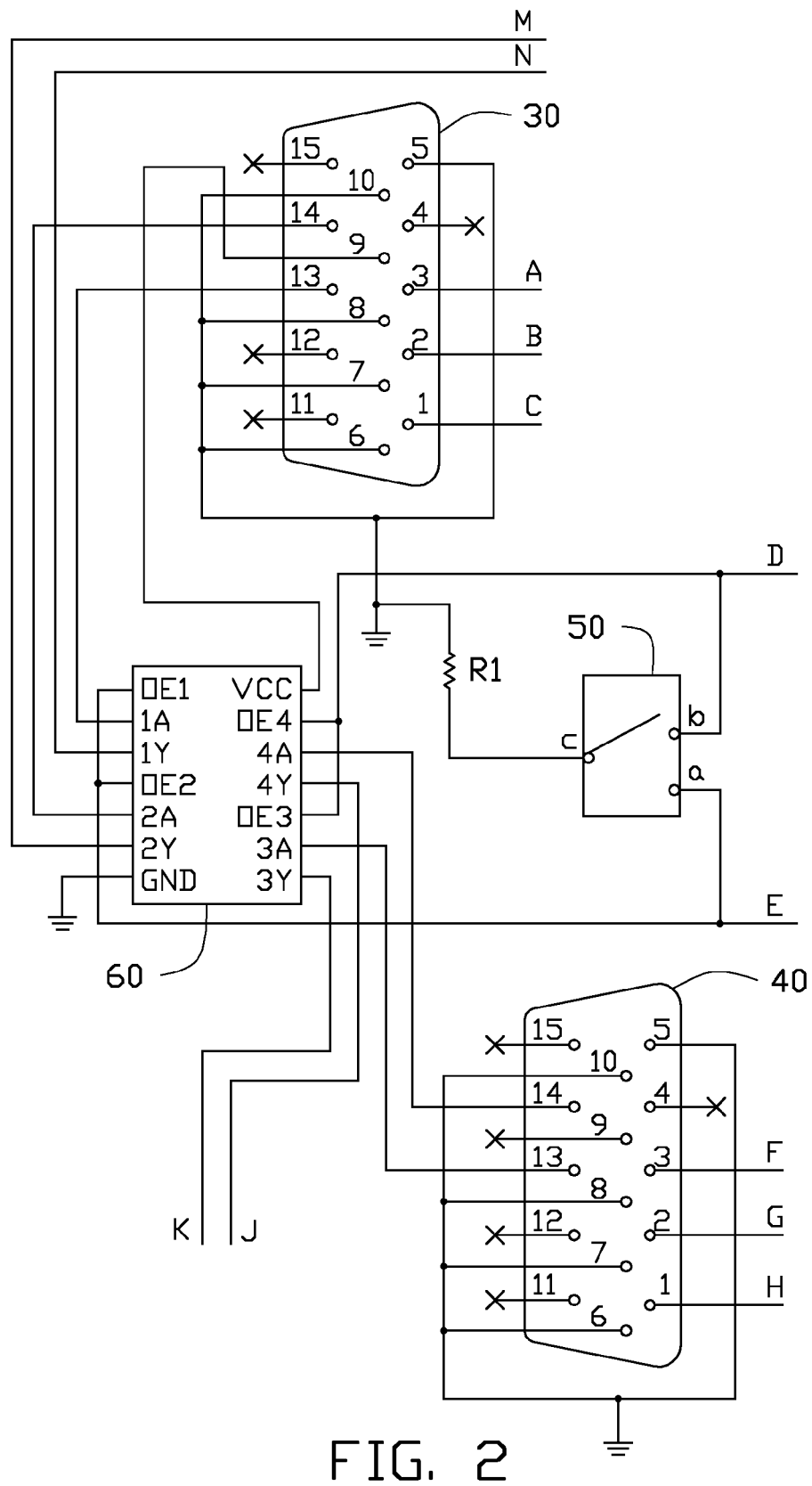
FIGS. 2 and 3 shows a circuit diagram of the VGA interface switch apparatus of FIG. 1.
Figure 3:
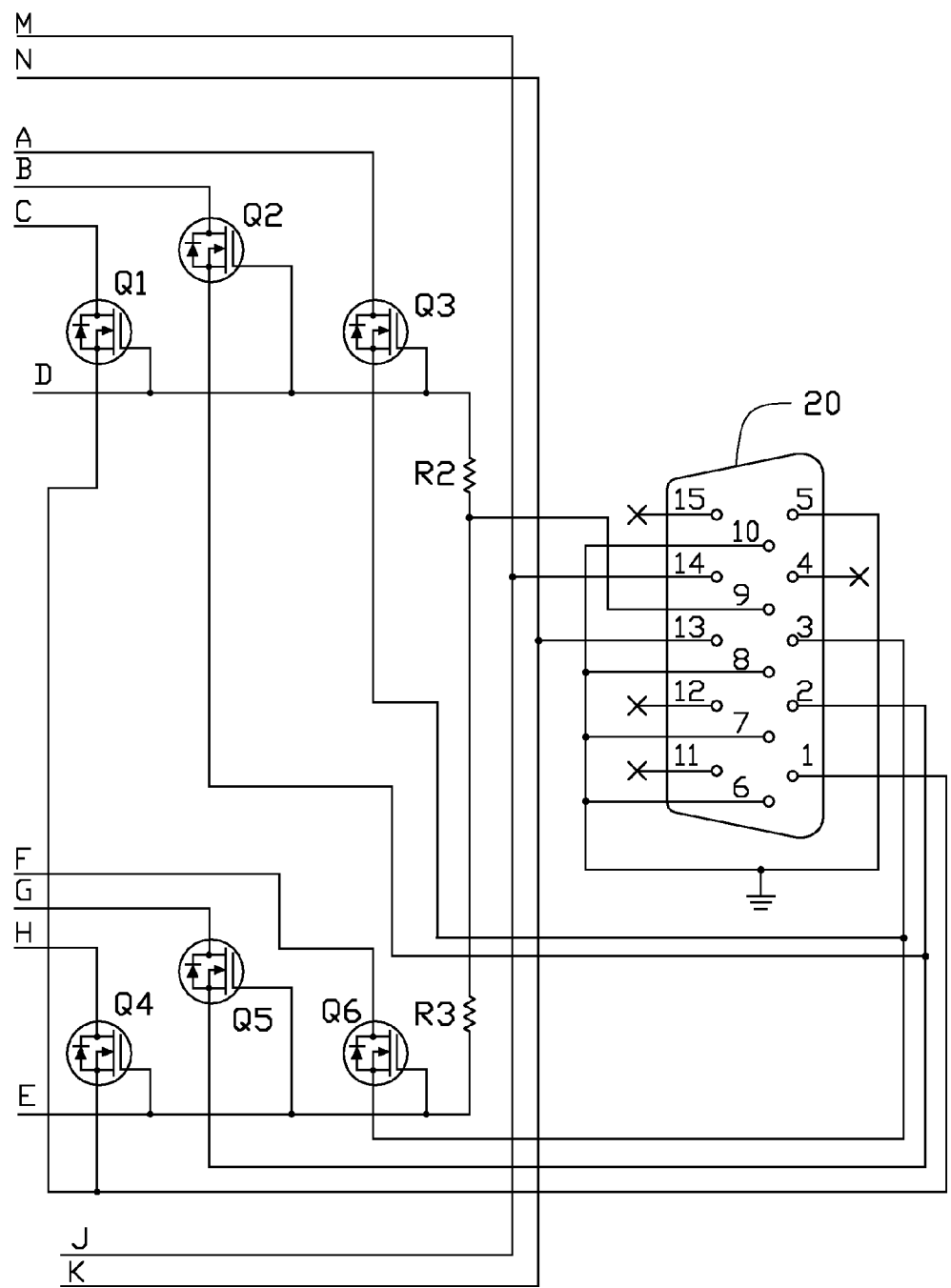

Referring to FIGS. 1 to 3, an embodiment of a video graphics array (VGA) interface switch apparatus 100 includes a first VGA interface 20, a second VGA interface 30, a third VGA interface 40, a single-pole double-throw (SPDT) switch 50, a switch control chip 60, six electronic switches Q1-Q6, and three resistors R1-R3. The switch 50 includes a pole c that is electrically connected to one of two throws a or b. When the switch 50 is pressed and the pole c is connected to throws a or b, the pole c is switched to be electrically connected to the other one of the throws a and b.

In one embodiment, the first to third VGA interfaces 20, 30, and 40 and the switch 50 are mounted on a rectangular case 70, but other elements are arranged in the case 70. In other embodiments, all of the elements can be arranged on a circuit board. In one embodiment, the electronic switches Q1-Q6 are n-channel metal-oxide-semiconductor (NMOS) field effect transistors (FETs). Each of the electronic switches Q1-Q6 includes first to third terminals respectively corresponding to a gate, a drain, and a source of the NMOS FET. In other embodiments, the electronic switches Q1-Q6 can be changed to other types of electronic switches, such as p-type transistors.

Each of the first to third VGA interfaces 20, 30, and 40 includes fifteen pins 1-15. In detail for each interface 20, 30, and 40, the pins 1-3 are respectively red-green-blue (RGB) three channel video signal pins, the pin 13 is a horizontal synchronization (HSYNC) pin, the pin 14 is a vertical synchronization (VSYNC) pin, the pin 9 is a power pin, the pins 5-8, and 10 are ground pins, the pins 4, 11, 12, and 15 are respectively ID0 pin, ID1 pin, SDA pin, and SCL pin. The pins 5-8, and 10 are grounded. The pins 4, 11, 12, and 15 are idle.

In one embodiment, the chip 60 is a quadruple bus buffer gate with 3-state outputs, such as an SN74LVC125ADBR chip. The chip 60 includes a power pin VCC, a ground pin GND, first to fourth enable pins OE1-OE4, first to fourth input pins 1A-4A, and first to fourth output pins 1Y-4Y. If the first enable pin OE1 is at a low voltage state, such as 0 volt (V), the first input pin 1A is connected to the first output pin 1Y. If the second enable pin OE2 is at a low voltage state, the second input pin 2A is connected to the second output pin 2Y. If the third enable pin OE3 is at a low voltage state, the third input pin 3A is connected to the third output pin 3Y. If the fourth enable pin OE4 is at a low voltage state, the fourth input pin 4A is connected to the fourth output pin 4Y.

The power pin VCC of the chip 60 is connected to the power pin 9 of the second VGA interface 30, the ground pin GND of the chip 60 is grounded. The first and second enable pins OE1 and OE2 are connected to the throw a of the switch 50, connected to the first terminals of the electronic switches Q4-Q6, and connected to the power pin 9 of the first VGA interface 20 through the resistor R3. The third and fourth enable pins OE3 and OE4 are connected to the throw b of the switch 50, connected to the first terminals of the electronic switches Q1-Q3, and connected to the power pin 9 of the first VGA interface 20 through the resistor R2. The pole c of the switch 50 is grounded through the resistor R1. The first input pin 1A and the first output pin 1Y of the chip 60 are respectively connected to the HSYNC pin 13 of the second VGA interface 30 and the HSYNC pin 13 of the first VGA interface 20. The second input pin 2A and the second output pin 2Y of the chip 60 are respectively connected to the VSYNC pin 14 of the second VGA interface 30 and the VSYNC pin 14 of the first VGA interface 20. The third input pin 3A and the third output pin 3Y of the chip 60 are respectively connected to the HSYNC pin 13 of the third VGA interface 40 and the HSYNC pin 13 of the first VGA interface 20. The fourth input pin 4A and the fourth output pin 4Y of the chip 60 are respectively connected to the VSYNC pin 14 of the third VGA interface 40 and the VSYNC pin 14 of the first VGA interface 20. The RGB pins 1-3 of the second VGA interface 30 are respectively connected to the second terminals of the electronic switches Q1-Q3. The RGB pins 1-3 of the third VGA interface 40 are respectively connected to the second terminals of the electronic switches Q4-Q6. The third terminals of the electronic switches Q1-Q3 are respectively connected to the third terminals of the electronic switches Q4-Q6, and respectively connected to the RGB pins 1-3 of the first VGA interface 20.

In use, the first VGA interface 20 is connected to a VGA interface of a display (not shown). The second VGA interface 30 and the third VGA interface 40 are respectively connected to a VGA interface of a first motherboard (not shown) and a VGA interface of a second motherboard (not shown). When the first and second motherboards are turned on, the power pin VCC of the chip 60 receives a power signal from the power pin 9 of the second VGA interface 30. If the pole c is electrically connected to the throw a of the switch 50, the first and second enable pins OE1 and OE2 are at low voltage states, the third and fourth enable pins OE3 and OE4 are at high voltage states, the first terminals of the electronic switches Q1-Q3 are at high voltage states, and the first terminals of the electronic switches Q4-Q6 are at low voltage states, therefore the electronic switches Q1-Q3 are turned on and the electronic switches Q4-Q6 are turned off, the pins 1, 2, 3, 13, and 14 of the first VGA interface 20 are respectively connected to the pins 1, 2, 3, 13, and 14 of the second VGA interface 30, namely the first motherboard can communicate with the display. If the switch 50 is pressed, the pole c is electrically connected to the throw b of the switch 50, the first and second enable pins OE1 and OE2 are at high voltage states, the third and fourth enable pins OE3 and OE4 are at low voltage states, the first terminals of the electronic switches Q1-Q3 are at low voltage states, and the first terminals of the electronic switches Q4-Q6 are at high voltage states, therefore the electronic switches Q1-Q3 are turned off and the electronic switches Q4-Q6 are turned on, the pins 1, 2, 3, 13, and 14 of the first VGA interface 20 are respectively connected to the pins 1, 2, 3, 13, and 14 of the third VGA interface 40, namely the second motherboard can communicate with the display. The VGA interface switch apparatus 100 can control two motherboards to selectively communicate with only one display, which can save on costs and space.

It is to be understood, however, that even though numerous characteristics and advantages of the embodiments have been set forth in the foregoing description, together with details of the structure and function of the embodiments, the disclosure is illustrative only, and changes may be made in details, especially in matters of shape, size, and arrangement of parts within the principles of the embodiments to the full extent indicated by the broad general meaning of the terms in which the appended claims are expressed.

What is claimed is:

1. A video graphics array (VGA) interface switch apparatus comprising:
    first to third VGA interfaces each comprising a power pin, a horizontal synchronization (HSYNC) pin, a vertical synchronization (VSYNC) pin, and three channel video signal pins;
    a single-pole double-throw (SPDT) switch comprising a pole, a first throw, and a second throw;
    a switch control chip comprising first to fourth enable pins, first to fourth input pins, and first to fourth output pins, wherein the first to fourth input pins are respectively connected to the first to fourth output pins in response to the corresponding first to fourth enable pins being at low voltage states;
    first to third resistors; and
    first to sixth electronic switches each comprising first to third terminals, wherein each electronic switch is turned on in response to the first terminal being at a high voltage state;
    wherein the first and second enable pins of the switch control chip are connected to the first throw of the SPDT switch, respectively connected to the first terminals of the fourth to sixth electronic switches, and connected to the power pin of the first VGA interface through the first resistor, wherein the third and fourth enable pins of the switch control chip are connected to the second throw of the SPDT switch, respectively connected to the first terminals of the first to third electronic switches, and connected to the power pin of the first VGA interface through the second resistor, the pole of the SPDT switch is grounded through the third resistor, the first input terminal and the first output terminal of the switch control chip are respectively connected to the HSYNC pin of the second VGA interface and the HSYNC pin of the first VGA interface, the second input terminal and the second output terminal of the switch control chip are respectively connected to the VSYNC pin of the second VGA interface and the VSYNC pin of the first VGA interface, the third input terminal and the third output terminal of the switch control chip are respectively connected to the HSYNC pin of the third VGA interface and the HSYNC pin of the first VGA interface, the fourth input terminal and the fourth output terminal of the switch control chip are respectively connected to the VSYNC pin of the third VGA interface and the VSYNC pin of the first VGA interface, the three channel video signal pins of the second VGA interface are respectively connected to the second terminals of the first to third electronic switches, the three channel video signal pins of the third VGA interface are respectively connected to the second terminals of the fourth to sixth electronic switches, the third terminals of the first to third electronic switches are respectively connected to the third terminals of the fourth to sixth electronic switches, and respectively connected to the three channel video signal pins of the first VGA interface.

2. The VGA interface switch apparatus of claim 1, wherein the switch control chip is a quadruple bus buffer gate with 3-state outputs.

3. The VGA interface switch apparatus of claim 1, wherein the first to sixth electronic switches are n-channel mental-oxide-semiconductor (NMOS) field effect transistors (FETs), the first to third terminals are respectively corresponding to gates, drains, and sources of the NMOS FETs.

* * * * *